(12) United States Patent
Muehlschlegel

(10) Patent No.: US 6,781,324 B2
(45) Date of Patent: Aug. 24, 2004

(54) BALLAST FOR AT LEAST ONE ELECTRIC INCANDESCENT LAMP

(75) Inventor: Joachim Muehlschlegel, Groebenzell (DE)

(73) Assignee: Patent-Treuhand-Gesellschaft fur elektrische Gluhlampen mbH, Munich (DE)

( * ) Notice: Subject to any disclaimer, the term of this patent is extended or adjusted under 35 U.S.C. 154(b) by 0 days.

(21) Appl. No.: 10/245,276

(22) Filed: Sep. 18, 2002

(65) Prior Publication Data

US 2003/0052623 A1 Mar. 20, 2003

(30) Foreign Application Priority Data

Sep. 18, 2001 (DE) ........................................ 101 46 030

(51) Int. Cl.⁷ .............................................. H05B 41/16
(52) U.S. Cl. ...................... 315/274; 315/282; 315/287; 315/279
(58) Field of Search ................. 315/274, 282, 315/287, 279, 246, 209 R, 225, 224, 247, 254, 269, 276, 291, 307, 312, 324, DIG. 4, 185 R

(56) References Cited

U.S. PATENT DOCUMENTS

| | | | | |
|---|---|---|---|---|
| 5,349,273 A | * | 9/1994 | Pacholok | .................. 315/307 |
| 5,404,082 A | * | 4/1995 | Hernandez et al. | ......... 315/219 |
| 5,612,595 A | * | 3/1997 | Maheshwari | ................. 315/291 |
| 5,930,121 A | * | 7/1999 | Henry | .......................... 363/16 |
| 6,181,086 B1 | * | 1/2001 | Katyl et al. | .................. 315/307 |
| 6,498,437 B1 | * | 12/2002 | Chang et al. | ................ 315/141 |

OTHER PUBLICATIONS

Franz Raiser, "Method for providing an output signal having a desired value of a characteristic quantity at the output of a switched–mode power supply unit and circuit for carrying out the method", published Apr. 30, 2002.

* cited by examiner

*Primary Examiner*—Tuyet T. Vo

(57) ABSTRACT

A ballast for at least one electric incandescent lamp, having at least two switching elements (T1, T2) that are coupled to one another with the formation of a first tie point (VP1), a drive circuit (10) with at least one output for driving the switching elements (T1, T2) with the aid of a drive signal that has a pulse duty factor (d) and an operating frequency ($f_s$), and with an input for a dimming signal ($U_d$), and a power transformer (Ü) whose primary side (L1) is coupled to the first tie point (VP1), it being possible to connect the electric incandescent lamp (LA1; LA2) to the secondary side (L2) thereof, the drive circuit (10) being designed to vary the pulse duty factor (d) and the operating frequency ($f_s$) of the drive signal as a function of the dimming signal ($U_d$).

11 Claims, 2 Drawing Sheets

BALLAST FOR AT LEAST ONE ELECTRIC INCANDESCENT LAMP

TECHNICAL FIELD

The present invention relates to a ballast for at least one electric incandescent lamp, having at least two switching elements that are coupled to one another with the formation of a first tie point, a drive circuit with at least one output for driving the at least two switching elements with the aid of a drive signal that is characterized by a pulse duty factor and an operating frequency, and with an input for a dimming signal, and a power transformer whose primary side is coupled to the first tie point, it being possible to connect the at least one electric incandescent lamp to the secondary side. It also relates to a method for operating a ballast for at least one electric incandescent lamp, in which the ballast comprises at least two switching elements that are coupled to one another with the formation of a first tie point, a drive circuit with at least one output for driving the at least two switching elements with the aid of a drive signal that is characterized by a pulse duty factor and an operating frequency, and with an input for a dimming signal, and a power transformer whose primary side is coupled to the first tie point, it being possible to connect the at least one electric incandescent lamp to the secondary side, the first step in the method being to apply a dimming signal to the input of the drive circuit, after which the drive circuit generates a drive signal as a function of the dimming signal.

BACKGROUND ART

The present invention relates to the dimming of electric incandescent lamps that are driven via what is termed an electronic transformer. In order to control such an electronic transformer via a digital or analog interface, it is necessary to be able to set the voltage at its output terminals over a wide voltage range. It is necessary in this case to be able, in particular, to set the voltage very accurately such that the light flux characteristic prescribed for dimming in what is termed the DALI Standard is observed, and thus all lamps of a group of electronic transformers appear equally bright even in the dimmed state. That is to say, different electronic transformers that drive different incandescent lamps must provide the same output voltage as precisely as possible in response to a dimming signal. This is necessary, since brightness differences are visible with particular effectiveness precisely in the dimmed state. A pulse-width method (asymmetric duty cycle) in which the power switches switch alternately in the half bridge is particularly advantageous for the output voltage setting required for dimming. In this case, the switch-on time of one switch is lengthened at the expense of the switch-on time of the other switch. The operating frequency remains constant in this method, and only the switch-on conditions of the switches change.

DISCLOSURE OF THE INVENTION

Although FIG. 1 shows an exemplary embodiment of the ballast according to the invention, it can also be used to describe the prior art: two power switches are denoted in FIG. 1 by T1 and T2, and are driven by a drive circuit 10 that is coupled, for its part, to the output of a dimmer 12, the dimmer 12 applying a dimming signal $U_d$ to the drive circuit 10. The supply voltage of the two switching elements T1 and T2 is what is termed the intermediate circuit voltage $U_z$, which is provided here across a capacitor $C_z$. The tie point VP1 of the two switching elements T1 and T2 is connected to the primary side L1 of a transformer Ü. The other terminal of the primary side L1 of the transformer Ü is connected to the tie point of two coupling capacitors $C_{k1}$, $C_{k2}$ that are connected with the other electrode to the capacitor $C_z$. At least one incandescent lamp LA1, LA2 is connected to the secondary side L2 of the transformer Ü.

FIG. 2 shows the profile of the voltage U1 on the primary side L1 of the transformer Ü, the pulse duty factor between the switch-on time t2 of the top switch T2 and the switch-on time t1 of the lower switch T1 being varied such that t1<t2.

The root-mean-square value of the secondary-side output voltage $U_{2\mathit{eff}}$ is calculated as:

$$U_{2\mathit{eff}} = \frac{U_z}{N} \cdot \sqrt{d \cdot (1-d)}.$$

Here, d stands for the pulse duty factor, that is to say d=t1/T, wherein T=t1+t2 denotes the period of the primary-side voltage U1 across the power transformer Ü, the reciprocal of which corresponds to the operating frequency $f_s$. As already mentioned, $U_z$ corresponds to the intermediate circuit voltage, and N to the number of turns per unit length of the power transformer Ü. The range 0 to 0.5 is permissible for d. It is usual in the case of dimming to dim down to a minimum value of approximately 1% of the maximum light flux. Very small pulse duty factors in the range of d=0.03 to 0.05 are achieved in this case. The switch-on time t1 is very small in this case. Consequently, the spectrum of the output voltage U2 is shifted drastically in the direction of higher frequencies. The voltage at the output terminals is affected thereby only to a small extent, the more so as the additional voltage drop across the transformer leakage inductance can be compensated by appropriate switching measures known from the prior art.

However, a particular disadvantage arises in the case of the use of a ballast to operate a plurality of incandescent lamps. Specifically, the shifting of the spectrum gives rise to a substantial inductive voltage drop across the supply leads to the incandescent lamps. This voltage drop can be up to several volts in the case of small pulse duty factors d and at customary operating frequencies from 30 kHz to 50 kHz. If a plurality of incandescent lamps in parallel connection are then operated by a ballast, they therefore burn, depending on the design of the lamp supply lead, that is to say, in particular, in accordance with the inductance of the lamp supply lead, which is determined essentially by the length of the lamp supply lead, with a clearly visible difference in brightness. With reference to the mode of operation mentioned first, in which individual incandescent lamps are driven by dedicated transformers, this likewise holds when these are dimmed jointly via a common digital bus.

It is therefore the object of the present invention to develop a generic ballast and the generic method in such a way that differences in brightness during operation of a plurality of incandescent lamps by such a ballast and during operation of various incandescent lamps having various electronic transformers, which are jointly dimmed via a common bus are avoided to a very large extent.

The above object is achieved according to a first aspect by virtue of the fact that the drive circuit is designed to vary the pulse duty factor and the operating frequency of the drive signal as a function of the dimming signal.

In accordance with a further aspect, the object is also achieved by a generic method in which in the second step the drive signal is generated by varying the operating frequency and the pulse duty factor as a function of the dimming signal.

This measure permits a substantial reduction in the operating frequency, as a result of which it is possible to considerably reduce or even entirely avoid a shifting of the spectrum of the output voltage during dimming. Furthermore, losses in the case of generic circuits are proportional to the operating frequency. The lowering of the operating frequency therefore results in fewer losses in the case of the invention. A further advantage with regard to the electromagnetic compatibility arises from the fact that fewer high-frequency components occur on the supply leads to the electric incandescent lamps. In addition, it is possible to select a more cost-effective timer for implementing the pulses, since the generation of narrow pulses is more difficult to implement technically, and the pulses can be selected to be wider in the case of the present invention. Consequently, the ballasts according to the invention can be implemented very cost-effectively owing to the reduced requirements of the timers.

In a preferred embodiment, the drive circuit is designed in the event of variation in the strobe signal to continue to take account of the supply voltage for the two switching elements and/or the current through the at least one incandescent lamp and/or the voltage on the secondary side of the power transformer. This measure permits the signal driving the switching elements to be even better optimized with regard to the efficiency of the power transformer.

The drive circuit is preferably designed to vary the operating frequency as a function of the pulse duty factor. Since the pulse duty factor and operating frequency are tuned to one another, and one or more relevant variables are taken into account in the definition of the pulse duty factor, this is a particularly simple possibility of fixing the operating frequency suitable therefor. In particular, the operating frequency thereby no longer needs to be calculated separately, but can be read out in a fashion suitable for the pulse duty factor, for example by using a look-up table.

According to the invention, the drive circuit is designed, in the event of a dimming signal that is correlated with a relatively low power to be transmitted by the power transformer, to reduce the operating frequency by comparison with the operating frequency in the event of a dimming signal that is correlated with a relatively high power to be transmitted by the power transformer.

The drive circuit is preferably designed, in the event of a dimming signal that is correlated with the maximum power to be transmitted by the power transformer, to generate a drive signal in the case of which the operating frequency is a maximum and, in the event of a dimming signal that is correlated with the minimum power to be transmitted by the power transformer, to generate a drive signal in the case of which the operating frequency is a minimum.

The minimum operating frequency of the drive signal is preferably determined in such a way that saturation still does not occur in the power transformer. The drive circuit can be designed to simplify the control, the drive circuit is designed to vary the operating frequency of the drive signal as a function of the dimming signal in a continuous fashion, a stepwise fashion and/or in accordance with the partly linearized curve profile.

The drive circuit can also be designed to reduce the operating frequency of the drive signal in such a way that the voltage-time area at the power transformer remains substantially constant. If the voltage-time area is selected in this case such that the transformer is operated with optimum efficiency in the case of maximum output power, this permits one or more incandescent lamps to be operated with very low losses in the ballast.

However, the voltage-time area can also be selected in such a way that the power transformer is operated at the saturation limit. The frequencies in the output spectrum thereby turn out to be minimum, and so the results turn out to be minimum with regard to electromagnetic compatibility, a timer that is to be selected, and power losses.

The ballast can comprise two switching elements in a half-bridge arrangement or four switching elements in a full-bridge arrangement.

Further advantageous embodiments follow from the sub-claims.

BRIEF DESCRIPTION OF THE DRAWINGS

An exemplary embodiment is described in more detail below with reference to the attached drawings, which.

BEST MODE FOR CARRYING OUT THE INVENTION

In an exemplary embodiment of the invention, the operating frequency $f_s$ is set such that the operating frequency is a maximum, that is to say $f_s=f_{s\_max}$, in a case of maximum output power and thus of a maximum pulse duty factor $d_{max}=0.5$. In the case of maximum output power, the power transformer Ü therefore works at optimum efficiency. If the output voltage, and thus the output power, are reduced by reducing the pulse duty factor d, the operating frequency $f_s$ is likewise reduced, according to the invention. The operating frequency $f_s$ is only lowered in this case, however, so far that saturation still does not arise in the power transformer Ü.

The minimum permissible operating frequency $f_s$, normalized to the maximum operating frequency $f_{s\_max}$ as a function of the pulse duty factor d for which saturation of the power transformer Ü still must not occur, is yielded as:

$$\frac{f_s}{f_{s\_max}} = 4 \cdot d(1-d)$$

Figure 3:
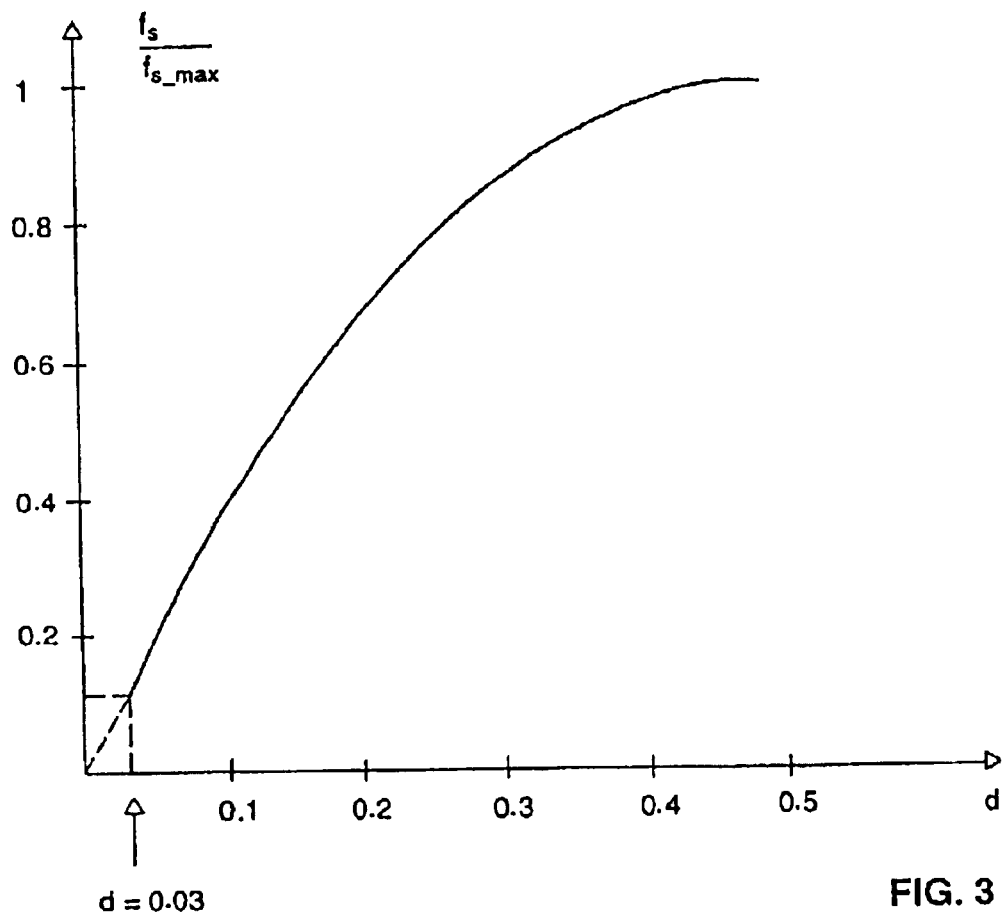
FIG. 3 shows the profile of the ratio of the operating frequency $f_s$ to be set to the maximum switching frequency $f_{s\_max}$, that is to say the operating frequency for a pulse duty factor d=0.5, against the pulse duty factor d.

This functional dependence is illustrated in FIG. 3. As already mentioned, in this case $f_{s\_max}$ is the maximum operating frequency that is reached for a maximum pulse duty factor $d_{max}=0.5$, and in the case of which saturation still does not occur during the maximum intermediate circuit voltage $U_{z\_max}$. The above formula is derived as follows:

The sum of the voltages across the coupling capacitors $C_{k1}$, $C_{k2}$ yields the intermediate circuit voltage $U_z$, and so $U_{Ck1}+U_{Ck2}=U_z$.

Figure 1:
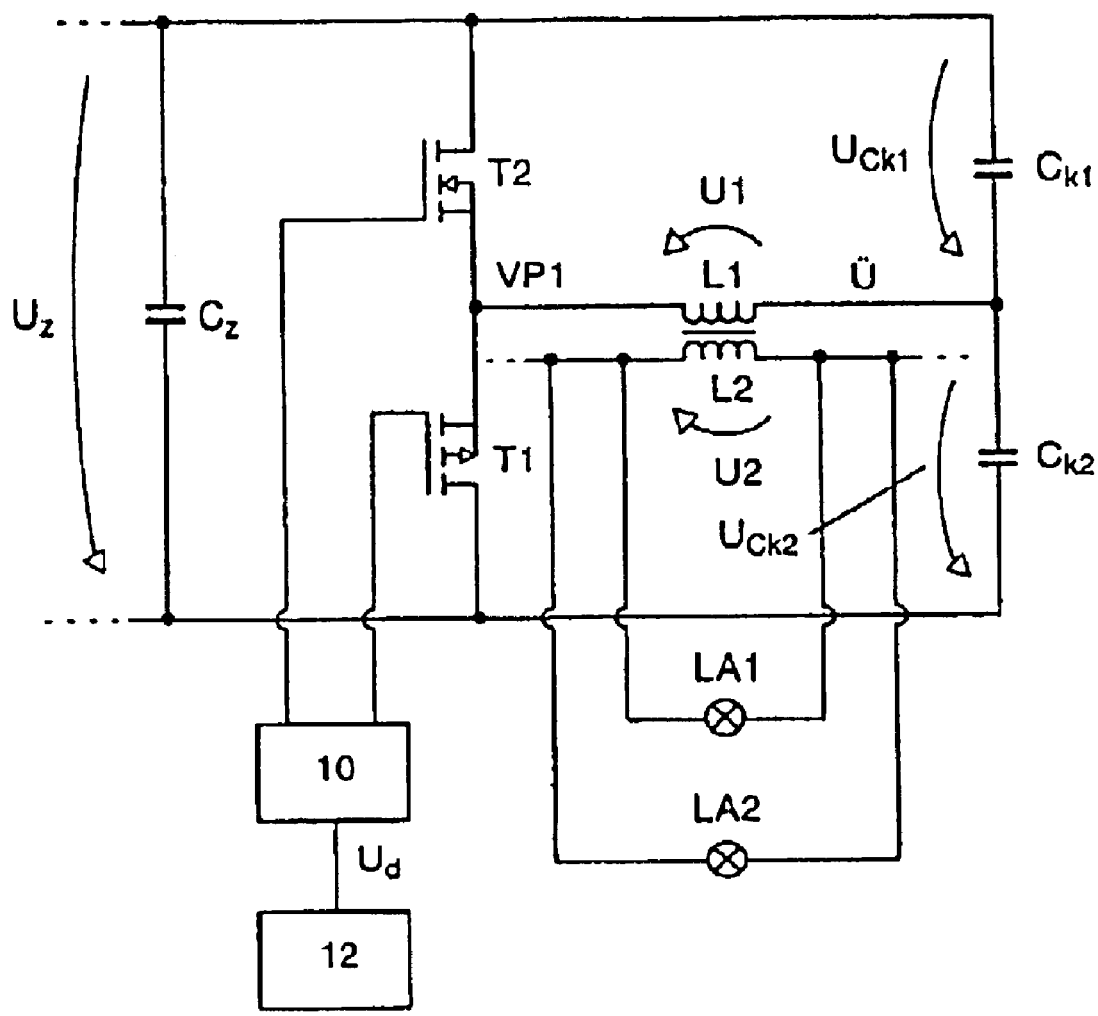
FIG. 1 shows a schematic of a circuit diagram of a ballast according to the invention.
Figure 2:
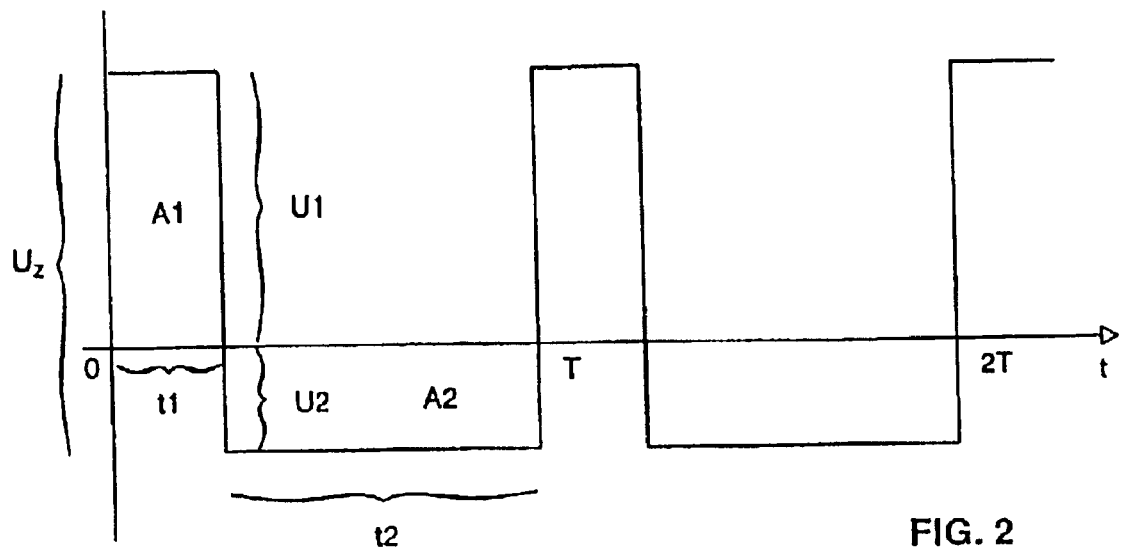
FIG. 2 shows the profile of the voltage on the primary side of the power transformer.

With reference to FIG. 2, the voltage-time areas A1 and A2 at the primary winding of the power transformer Ü (in the steady state) are equally large, since only alternating current flows through the coupling capacitors $C_{k1}$, $C_{k2}$. It therefore holds that:

$A1=U1 \cdot t1=A2=U2 \cdot t2$.

As already mentioned at the beginning, it holds further that $$d = \frac{t1}{T}; T = t1 + t2; f_s = \frac{1}{T}.$$

One possibility of adapting the switching frequency $f_s$ consists in reducing the operating frequency continuously in such a way that the voltage-time area at the power transformer Ü remains constantly at the value $A_{Des}$. $A_{Des}$ can be selected in this case such that the transformer Ü is operated with optimum efficiency in conjunction with the maximum output power. However, $A_{Des}$ can also be selected such that the power transformer Ü is operated at the limit in relation to saturation. The result in both cases is a profile $f_s/f_{s\_max}$ according to the above formula, the normalization frequency $f_{s\_max}$ determining whether the power transformer is operated at optimum efficiency or at the limit in relation to saturation.

Another possibility of adapting the operating frequency $f_s$ to the pulse duty factor d consists in lowering the operating frequency $f_s$ in steps. If a specific value of the pulse duty factor d is undershot when the output power is reduced, the operating frequency $f_s$ is lowered to the associated value. The adaptation of the operating frequency $f_s$ can also be performed in such a way that the profile according to the above equation is approached by straight line segments, for example by partial linearization.

The invention can be applied when implementing the ballast with the aid of a half-bridge converter and equally with the aid of a full-bridge converter.

The substantial reduction in the operating frequency owing to the measure according to the invention may be represented by an example:

Given a pulse duty factor of d=0.03, which corresponds to a dimming to approximately 1% of the maximum light flux, the above equation yields a lowering of the operating frequency $f_s$ to 4×0.03×(1−0.03)×100%=11.6% of the maximum operating frequency $f_{s\_max}$, without the power transformer Ü going over into the saturated mode. On the other hand, here the power transformer can be operated with optimum efficiency given a pulse duty factor d=0.5, that is to say given maximum output power (refer to a fixed intermediate circuit voltage $U_z$).

The invention can be undertaken with the aid of a microcontroller without additional outlay on circuitry, or with the aid of a suitable analog or digital circuit. In the case of alternative embodiments, it is possible to carry out a normalization of the operating frequency $f_s$ to other criteria as well, for example to minimum losses in the transformer, or optimum thermal conditions. It is to be taken into account in this case that an optimum transformer utilization occurs near the thermal limit thereof.

It can be sensible with regard to acoustic effects to limit the ratio of $f_s$ to $f_{s\_max}$ to a minimum of 0.4.

What is claimed is:

1. A ballast for at least one electric incandescent lamp, having
   at least two switching elements (T1, T2) that are coupled to one another with the formation of a first tie point (VP1),
   a drive circuit (10) with at least one output for driving the at least two switching elements (T1, T2) with the aid of a drive signal that is characterized by a pulse duty factor (d) and an operating frequency ($f_s$), and with an input for a dimming signal ($U_d$), and
   a power transformer (Ü) whose primary side (L1) is coupled to the first tie point (VP1), it being possible to connect the at least one electric incandescent lamp (LA1; LA2) to the secondary side (L2) thereof, characterized in that the drive circuit (10) is designed to: (i) vary the pulse duty factor (d) and the operating frequency ($f_s$) of the drive signal as a function of the dimming signal ($U_d$); and (ii) vary the operating frequency ($f_s$) as a function of the pulse duty factor (d).

2. The ballast as claimed in claim 1, characterized in that the drive circuit (10) is designed in the event of variation in the strobe signal (d) to continue to take account of the supply voltage ($U_z$) for the two switching elements (T1, T2) and/or the current through the at least one incandescent lamp (LA1) and/or the voltage (U2) on the secondary side of the power transformer (Ü).

3. The ballast as claimed in claim 1, characterized in that the drive circuit (10) is designed, in the event of a dimming signal ($U_d$) that is correlated with a relatively low power to be transmitted by the power transformer (Ü), to reduce the operating frequency ($f_s$) by comparison with the operating frequency ($f_s$) in the event of a dimming signal ($U_d$) that is correlated with a relatively high power to be transmitted by the power transformer.

4. The ballast as claimed in claim 1, characterized in that the drive circuit (10) is designed, in the event of a dimming signal ($U_d$) that is correlated with the maximum power to be transmitted by the power transformer (Ü), to generate a drive signal in the case of which the operating frequency ($f_s$) is a maximum and, in the event of a dimming signal ($U_d$) that is correlated with the minimum power to be transmitted by the power transformer (Ü), to generate a drive signal in the case of which the operating frequency ($f_s$) is a minimum.

5. The ballast as claimed in claim 1, characterized in that the minimum operating frequency ($f_s$) of the drive signal is determined in such a way that saturation still does not occur in the power transformer (Ü).

6. The ballast as claimed in claim 1, characterized in that the drive circuit (10) is designed to vary the operating frequency ($f_s$) of the drive signal as a function of the dimming signal ($U_d$) in a continuous fashion, a stepwise fashion and/or in accordance with the partly linearized curve profile.

7. The ballast as claimed in claim 1, characterized in that the ballast comprises two switching elements (T1, T2) in a half-bridge arrangement.

8. The ballast as claimed in claim 1, characterized in that the drive circuit (10) is designed to reduce the operating frequency ($f_s$) of the drive signal in such a way that the voltage-time area (A1; A2; $A_{Des}$) at the power transformer (Ü) remains substantially constant.

9. The ballast as claimed in claim 8, characterized in that the voltage-time area (A1; A2; $A_{Des}$) is selected in such a way that the power transformer (Ü) is operated with optimum efficiency in the event of maximum power to be transmitted.

10. The ballast as claimed in claim 8, characterized in that the voltage-time area (A1; A2; $A_{Des}$) is selected in such a way that the power transformer (Ü) is operated at the saturation limit.

11. A method for operating a ballast for ax least one electric incandescent lamp, in which the ballast comprises at least two switching elements (T1, T2) that are coupled to one another with the formation of a first tie point (VP1); a drive circuit (10) with at least one output for driving the at least two switching elements (T1, T2) with the aid of a drive signal that is characterized by a pulse duty factor (d) and an operating frequency ($f_s$), and with an input for a dimming signal ($U_d$), and a power transformer ($\ddot{U}$) whose primary side (L1) is coupled to the first tie point (VP1), it being possible to connect the at least one electric incandescent lamp (LA1, LA2) to the secondary side (L2), comprising the following steps:

a) applying a dimming signal ($U_d$) to the input of the drive circuit (10);

b) generating a drive signal with the aid of the chive circuit (10) as a function of the dimming signal ($U_d$), characterized in that in step b) the drive signal is generated by varying the operating frequency ($f_s$) and the pulse duty factor (d) as a function of the dimming signal ($U_d$), wherein the operating frequency ($f_s$) is varied as a function of the pulse duty factor (d).

* * * * *